Feb. 4, 1936.　　　　　H. BERG　　　　　2,029,458
BORING TOOL
Filed May 28, 1934
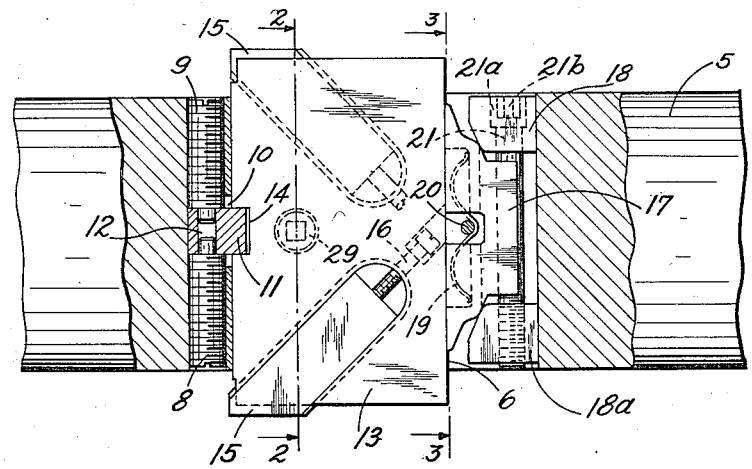
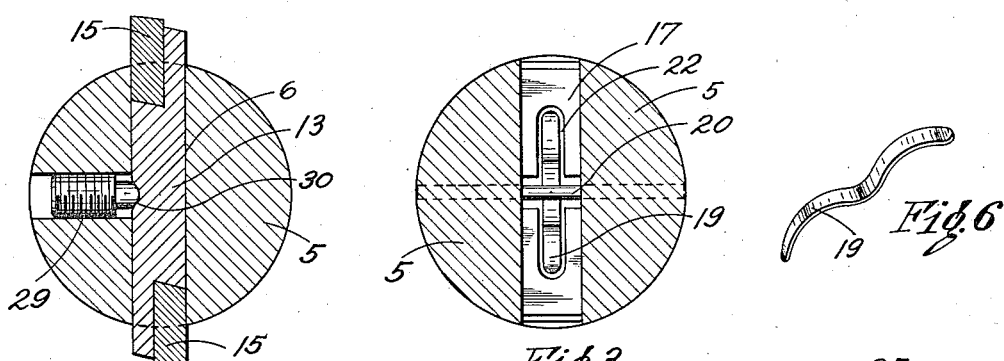
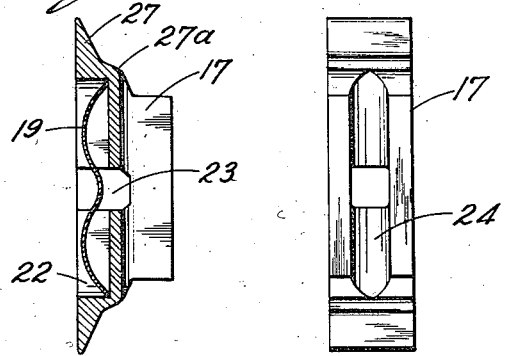 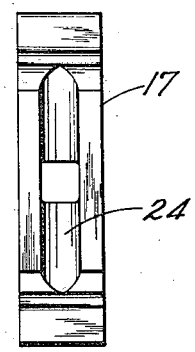 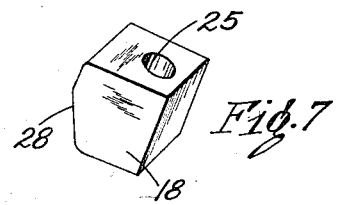
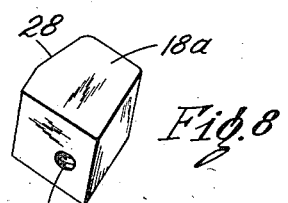
Inventor
HERMAN BERG
By Richey & Watts
Attorneys Patented Feb. 4, 1936

2,029,458

UNITED STATES PATENT OFFICE 2,029,458

BORING TOOL

Herman Berg, Cleveland, Ohio, assignor to The Kelly Reamer Company, Cleveland, Ohio, a corporation of Ohio Application May 28, 1934, Serial No. 727,958

7 Claims. (Cl. 77—56)

This invention relates broadly to reamers or boring tools, and more specifically to improvements in mechanism for retaining a cutting tool in a boring bar stub arbor or analogous support.

The primary object of the invention is to provide a device for securing a cutting tool or holder therefor within the boring bar and to this end the invention contemplates an improved and simplified construction relative to prior known devices of this class. More specifically, the invention comprehends a tool clamping or locking device which may be readily adjusted to secure the cutter in operative position, the device being constructed to accommodate a minimum of travel or movement of the parts which effect the clamping action.

A further object of the invention is to produce a device which is so constructed to eliminate the danger of springing or breaking of parts of the assembly when adjusting the device into clamping position.

Another object of the invention is to construct a clamping device in which a self-cleaning or wiping action between certain parts thereof is effected during the adjusting action; and further a clamping or locking device wherein the parts are sturdy of construction and susceptible of economic manufacture and assembly.

Other objects and advantages more or less ancillary to the foregoing reside in the specific construction and aggroupment of elements peculiar to the structure, as will become apparent from a more complete examination of this specification, in the claims whereof there are assembled certain combinations of parts and structure indicative of the scope and spirit of the invention.

In the drawing:

Figure 1 is an elevational view, partially in section, of a portion of a boring bar embodying the invention;

Figs. 2 and 3 are transverse sectional views taken on planes indicated by the lines 2—2 and 3—3, respectively, Fig. 1;

Fig. 4 is a central longitudinal sectional view of the tool-clamping member; Fig. 5 is a view in rear elevation of said member; and Figs. 6, 7 and 8 are detail perspective views of parts of the tool-clamping assembly.

Referring to the drawing and particularly to Fig. 1 thereof, the boring bar 5 is formed with a rectangular slot 6 therein, the major axis thereof being in coaxial relation with the bar. Adjacent the slot 6 there is a threaded bore 7 in which adjusting screws 8 and 9 are mounted. The wall of the bar 5 intermediate the slot 6 and the bore 7 is centrally apertured or slotted, as at 10, to receive a guide block or tongue 11, the latter being recessed or apertured, as at 12, to receive the shank-end portions of the adjusting screws 8 and 9. Slot 10 is of suitable width with respect to the tongue 11 to accommodate diametric adjustments of the tongue within the boring bar.

For the purposes of illustration, the cutting tool shown herein embodies a tool block 13 provided with a notch 14 in the forward edge thereof which is dimensioned to snugly engage the tongue 11. The tool bits or cutters 15 may be retained within the block 13 in any suitable manner, such as through the dove-tail connection shown, and may be adjusted radially with respect to the axis of the boring bar by set screws 16. The length of the slot 6 is proportioned relative to the tool block and locking device to permit the clamping engagement of the assembly against the end wall of the slot and upon release of the locking device the ready retraction of the tool block from the boring bar.

The locking device or clamping assembly comprises a clamping block 17, sliding end cam blocks 18 and 18a, a resilient retracting member embodying a saddle-shaped leaf spring 19, a centering pin 20, and draw bolt 21. The clamping block 17 is formed with a longitudinal slot or recess 22 in the face thereof in which a spring 19 is seated with the opposed ends thereof engaging the end portions of the slot, note Fig. 4. The clamping block is also formed with a transverse recess 23 through which pin 20 is passed, the curved central portion of spring 19 normally bearing against said pin. The rear wall of the block 17 is constructed with a longitudinal slot 24 for the reception of a draw bolt 21. The latter is formed with a head 21a having a socket 21b therein configured to accommodate a socket wrench or like tool.

The cam block 18 is formed with a counter bore 25 in which the head 21a of the bolt 21 is engaged, while the block 18a is tapped as at 26 for engagement with the threaded end of said bolt.

The extremities of the clamp block 17 are each formed with cam portions 27 and 27a adapted to coact with cam surfaces 28 formed on the blocks 18 and 18a. The cams 27a constitute the clamping cams and are each relatively abrupt to a certain point and thereafter taper more gradually; thereby effectuating an initial relatively short and rapid throw of the clamp block 17 toward the tool block 13 until the more gradually tapered portion is reached, whereupon the throw becomes more gradual with greater leverage. When the block 17 is in its extreme retracted position, the surfaces 27 are contiguous to, or in contact with the surfaces 28.

The boring bar is provided with a set screw 29, note Fig. 2, which is disposed in one of the walls adjacent the slot 6. The end of this screw is formed to provide a detent coordinated for engagement with a recess 30 in the face of the tool holder 13 and loosely supports the cutter within the bar when the tongue 11 is disengaged with the notch 14 in block 13 and the cutting tools are permitted to float as in a reaming operation.

In assembly and operation, the cutting tool, comprising the block 13 and bits 15, is mounted in the boring bar 5 with the clamping assembly in juxtaposition therewith, as shown in Fig. 1. Centralization of the cutting tool is effected by the position of the tongue 11, or may be varied if necessary by adjusting the screws 8 and 9. A suitable tool or socket wrench is then inserted in socket 21b of the draw bolt 21 and the latter turned to draw the cam blocks 18 and 18a toward each other over the cam surfaces 27a, thereby forcing the clamping block 17 against the tool block 13, the pin 20 holding the block against lateral movement during this operation. To retract the block 17, the draw bolt 21 is loosened and blocks 18 and 18a are retracted, the spring 19 then forcing the block 17 back to clear the tongue 11.

It will be noted that the draw bolt 21 is threaded only at one end while the headed end 21a thereof engages the other cam block. Thus the cam blocks have in effect a floating cam action on the block 17. This construction, though not deemed necessary is preferred in practice since it ensures coaction between the wedge blocks to the limit of the clamping operation.

The contacting cam surfaces 27a and 28 are always maintained clear of chips, since the forward rounded edge of each block 18, 18a wipes and clears its coacting cam surface when moving thereover.

Although the foregoing description is necessarily of a detailed character in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

I claim:

1. In a boring or reaming tool assembly, a boring bar having a slot formed therethrough, a tool block mounted in said slot, and a clamping assembly positioned between the tool block and adjacent end wall of the slot; said assembly comprising a clamping block having an elongated face adapted to exert clamping pressure on the tool block and rear cam portions at opposite extremities thereof, cam blocks disposed between said cam portions and the adjacent end wall of the slot, and a draw bolt connecting said cam blocks for contracting the latter into engagement with the cam portions and thereby move the clamping block into clamping position with respect to the tool block, each of said cam portions being relatively abrupt at its starting point to effect an initial relatively short and rapid throw of the clamping block and thereafter tapering off gradually to provide greater leverage for the cam blocks when the actual clamping action takes place.

2. In a boring or reaming tool assembly, a boring bar having a slot formed therethrough, a tool block mounted in said slot, and a removable clamping assembly positioned between the tool block and adjacent end wall of the slot; said assembly comprising a clamping block having an elongated face portion adapted to abut the tool block and exert clamping pressure thereon, the clamping block being formed with a rear portion having a longitudinal groove formed therein, cam portions formed at opposite extremities of the clamping block between said face portion and rear groove portion, cam blocks disposed between the opposite extremities of the clamping block and the adjacent end wall of the slot and adapted to act on said cam portions, a draw bolt positioned in said longitudinal groove and connecting said cam blocks for contracting and expanding the latter, means for anchoring the clamping block to the boring bar to hold the block against lateral displacement, and resilient means associated with said anchoring means for retracting the clamping block clear of the tool block upon expansion of said cam blocks.

3. In a boring or reaming tool assembly, a boring bar having a slot formed therethrough, a tool block mounted in said slot, and a removable clamping assembly positioned between the tool block and adjacent end wall of the slot; said assembly comprising a clamping block having an elongated face portion arranged to abut the tool block and a longitudinally grooved rear portion, the clamping block being formed with cam surfaces at opposite extremities thereof in rear of said face portion, cam blocks disposed between said cam surfaces and the adjacent end wall of the slot, a draw bolt mounted in the longitudinal groove formed in the clamping block and connecting the cam blocks for contracting and expanding the latter to move the clamping block into and release it from clamping pressure with respect to the tool block, said clamping block being formed with a longitudinal recess in the face portion thereof and a transverse recess intersecting said longitudinal recess, a leaf spring mounted in said longitudinal recess, and an anchor pin mounted in said transverse recess, said spring straddling the anchor pin and serving to retract the clamping blocks clear of the tool block upon expansion of said cam blocks.

4. A boring or reaming tool assembly comprising: a boring bar having a slot formed therethrough, a tool block mounted in said slot, said boring bar and block being formed with aligned recesses, a tongue mounted in said boring bar and having a portion thereof extending within the said slot and arranged for transaxial adjustment relatively to the boring bar, adjusting screws mounted in said bar and adapted to engage said tongue, the said tool block having a recess in the marginal edge thereof for receiving said tongue, a clamping assembly mounted in said slot intermediate the end wall thereof and the tool block, said clamping assembly comprising a clamping block having an elongated face portion adapted to contact the tool block, and a rear portion having a longitudinal groove formed therein, the clamping block being formed with cam portions at opposite extremities thereof, a draw bolt disposed in said longitudinal groove, cam blocks mounted on opposite ends of said draw bolt and arranged to act on said cam portions, the face portion of said clamping block being formed with a longitudinal recess, and a transverse recess intersecting said longitudinal recess, a pin passed through said transverse recess and anchored to the boring bar for holding the clamping block against tranverse displacement with respect to the tool block, and a saddle shaped leaf spring mounted in said longitudinal recess and straddling said pin.

5. In a boring or reaming tool assembly, a boring bar having a slot formed therethrough, a tool block mounted in said slot, and a clamping assembly positioned between the tool block and the adjacent end wall of the slot; said assembly comprising a clamping block having an elongated face adapted to bear against the tool block and rear cam portions at opposite extremities thereof, cam blocks arranged to bear against said cam portions, means for contracting and expanding said blocks to thereby move the clamping block into clamping position with respect to the tool block, means for anchoring the clamping block against displacement with respect to the boring bar, while permitting limited movement longitudinally of the latter, and a spring coacting with said anchoring means for urging the clamping block clear of the tool block when the cam blocks are expanded.

6. In a boring or reaming tool assembly, a boring bar having a slot formed therethrough, a tool block mounted in said slot, a guide block or tongue interposed between one end wall of the slot and the tool block and engaging in an aperture formed in the tool block, and a removable clamping assembly positioned between the tool block and the opposite end wall of the slot; said assembly comprising a clamping block adapted to exert clamping pressure on the tool block and having cam portions at opposite extremities thereof, cam blocks disposed between the said cam portions and adjacent end wall of the slot, means for contracting said cam blocks to thereby move the clamping block into clamping position with respect to the tool block, means for anchoring the clamping block against lateral displacement with respect to the boring bar while permitting limited movement of said block longitudinally of the bar, and means co-acting with said anchoring means for retracting the clamping block from the tool block upon release of said cam blocks such distance as will permit the clamping block to clear said guide block or tongue.

7. In a boring or reaming tool assembly, a boring bar having a slot formed therethrough, a tool block mounted in said slot, an adjustable guide block or tongue interposed between one end wall of the slot and the tool block and engaging in an aperture formed in the tool block, and a removable clamping assembly positioned between the tool block and adjacent end wall of the slot; said assembly comprising a clamping block adapted to exert clamping pressure on the tool block and having cam portions at opposite extremities thereof, cam blocks disposed between said cam portions and the adjacent end wall of the slot, a draw bolt connecting said cam blocks for contracting and expanding the latter to thereby move the clamping block into and from clamping engagement with respect to the tool block, means for holding the clamping block against lateral movement with respect to the boring bar, and a spring coacting with said latter means for retracting the clamping block from the tool block upon expansion of said cam blocks such distance as will permit the clamping block to clear said guide block or tongue.

HERMAN BERG.